US012779629B2

(12) United States Patent
Chen et al.

(10) Patent No.: US 12,779,629 B2
(45) Date of Patent: Nov. 3, 2026

(54) CAPILLARY TUBE PLIERS

(71) Applicants: HEFEI HAIER REFRIGERATOR CO., LTD, Anhui (CN); QINGDAO HAIER REFRIGERATOR CO., LTD., Qingdao (CN); HAIER SMART HOME CO., LTD., Qingdao (CN)

(72) Inventors: Lijing Chen, Qingdao (CN); Xian Sun, Qingdao (CN); Liang Wang, Qingdao (CN)

(73) Assignees: HEFEI HAIER REFRIGERATOR CO., LTD, Anhui (CN); QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 343 days.

(21) Appl. No.: 18/290,626

(22) PCT Filed: Mar. 11, 2022

(86) PCT No.: PCT/CN2022/080433
§ 371 (c)(1),
(2) Date: Jan. 19, 2024

(87) PCT Pub. No.: WO2023/000690
PCT Pub. Date: Jan. 26, 2023

(65) Prior Publication Data

US 2025/0083284 A1 Mar. 13, 2025

(30) Foreign Application Priority Data

Jul. 22, 2021 (CN) ......................... 202110832276.6

(51) Int. Cl.
*B25B 7/02* (2006.01)
*B25B 7/12* (2006.01)

(52) U.S. Cl.
CPC . *B25B 7/02* (2013.01); *B25B 7/12* (2013.01)

(58) Field of Classification Search
CPC .................................... B25B 7/02; B25B 7/12
(Continued)

(56) References Cited

U.S. PATENT DOCUMENTS 2,989,099 A * 6/1961 Damm ...................... B25B 7/02 D8/52
5,195,353 A 3/1993 Erbrick et al.
(Continued)

FOREIGN PATENT DOCUMENTS

CN 2236927 Y 10/1996
CN 201267897 Y 7/2009
(Continued)

*Primary Examiner* — Hadi Shakeri
(74) *Attorney, Agent, or Firm* — MUNCY, GEISSLER, OLDS & LOWE, P.C.

(57) ABSTRACT

A capillary tube plier includes a first clamping arm, a second clamping arm, a first pressing portion, and a second pressing portion. The first end of the first clamping arm and the first end of the second clamping arm extend oppositely to each other to form first pivot portions. The first pressing portion is provided at the second end of the first clamping arm, forming a first pressing surface at the protruding position. The second pressing portion is provided at the second end of the second clamping arm, forming a second pressing surface at the protruding position. The extension length of the first pivot portion of the first clamping arm is substantially equal to the protruding length of the first pressing surface from the first clamping arm; similarly for the second clamping arm.

8 Claims, 6 Drawing Sheets

(58) Field of Classification Search
USPC .................................................. 81/436.5, 423
See application file for complete search history.

(56) References Cited

U.S. PATENT DOCUMENTS

| | | | | |
|---|---|---|---|---|
| 5,802,690 | A * | 9/1998 | Bullock | B25B 7/04 29/268 |
| 5,884,540 | A * | 3/1999 | Mo | B25B 7/04 81/426 |
| 2006/0248730 | A1 | 11/2006 | Miller et al. | |
| 2008/0066281 | A1 * | 3/2008 | Allen | B25B 7/02 29/268 |
| 2019/0090670 | A1 | 3/2019 | Luh | |

FOREIGN PATENT DOCUMENTS

| | | | |
|---|---|---|---|
| CN | 203438157 | U | 2/2014 |
| CN | 104226752 | A | 12/2014 |
| CN | 204277907 | U | 4/2015 |
| CN | 104942724 | A | 9/2015 |
| CN | 204657182 | U | 9/2015 |
| CN | 205600018 | U | 9/2016 |
| CN | 106002668 | A | 10/2016 |
| CN | 113524060 | A | 10/2021 |

* cited by examiner

CAPILLARY TUBE PLIERS

TECHNICAL FIELD

The present invention relates to the field of piping technology for capillary tubes in refrigeration devices, in particular to a capillary tube plier.

BACKGROUND

For cooling devices, it is generally necessary to clamp the capillary tube into a certain shape to fit with the parts in the cooling device. Ordinary pliers are generally V-shaped. During the process of clamping the capillary tube into a certain shape, oblique cutting torque is generated, causing damage to the capillary tube, even flattening and fracture. Damaged capillary tubes, when assembled into parts, are prone to fracture, vibration leakage, or blockage during the transportation of the cabinet, necessitating replacement and repair, causing inconvenience in production and use.

SUMMARY

An object of the present invention is to provide a capillary tube plier to solve the problem of damage caused by unbalanced forces during the clamping process.

A further object is to solve the technical problem of easy operation of the pliers.

Another object is to address the issue of multi-use for a single pair of pliers.

In particular, the present invention provides a capillary tube plier, comprising:

a first clamping arm;

a second clamping arm, wherein first pivot portions are formed by extending oppositely to each other from a first end of the first clamping arm and a first end of the second clamping arm respectively, and the first pivot portions are connected by a first pivot axis for allowing the first and second clamping arms to rotate relative to each other;

a first pressing portion, provided at a second end of the first clamping arm, protruding towards the second clamping arm and forming a first pressing surface; and a second pressing portion, provided at a second end of the second clamping arm, protruding towards the first clamping arm and forming a second pressing surface, with the second pressing surface and the first pressing surface set oppositely, and when the first clamping arm rotates to close with the second clamping arm, the first pressing surface and the second pressing surface presses tightly;

wherein the extension length of the first pivot portion of the first clamping arm is substantially equal to the protruding length of the first pressing surface from the first clamping arm; the extension length of the first pivot portion of the second clamping arm is substantially equal to the protruding length of the second pressing surface from the second clamping arm; to make the first pressing surface and second pressing surface receive even force when pressed.

Optionally, the first pressing surface provides a first accommodating slot passing through the first pressing surface; the second pressing surface provides a second accommodating slot passing through the second pressing surface;

when the first pressing surface and the second pressing surface are pressed, the first accommodating slot and the second accommodating slot align oppositely to form a clamping cavity.

Optionally, the first pressing surface is configured according to a required shape of a capillary tube, and the second pressing surface is adapted to the shape of the first pressing surface to press the capillary tube into the desired shape.

Optionally, the first pressing portion is detachably assembled at the second end of the first clamping arm;

the second pressing portion is detachably assembled at the second end of the second clamping arm.

Optionally, a first cylinder protruding from the second end of the first clamping arm;

the first pressing portion comprises a first locking nut and a first pressing portion body, a first bolt protruding from the end of the first pressing portion body opposite to the first pressing surface, the first bolt passes through and protrudes from the first cylinder, and the portion of the first bolt protruding from the first cylinder is fitted with the first locking nut to fix the first pressing portion body at the second end of the first clamping arm;

a second cylinder protruding from the second end of the second clamping arm;

the second pressing portion comprises a second locking nut and a second pressing portion body, a second bolt protruding from the end of the second pressing portion body opposite to the second pressing surface, the second bolt passes through and protrudes from the second cylinder, and the portion of the second bolt protruding from the second cylinder is fitted with the second locking nut to fix the second pressing portion body at the second end of the second clamping arm.

Optionally, the first cylinder provides a first notch, and the first pressing portion body provides a first protrusion, the first protrusion is accommodated in the first notch to position the first pressing portion body relative to the first cylinder;

the second cylinder provides a second notch, and the second pressing portion body provides a second protrusion, the second protrusion is accommodated in the second notch to position the second pressing portion body relative to the second cylinder.

Optionally, the capillary tube plier further comprising:

a first plier arm, wherein second pivot portions are formed by extending oppositely to each other from an end of the first plier arm and the first end of the first clamping arm respectively, the second pivot portions are connected by a second pivot axis; and a second plier arm, wherein third pivot portions are formed by extending oppositely to each other from an end of the second plier arm and the end of the first plier arm respectively, the third pivot portions are connected by a third pivot axis;

wherein fourth pivot portions are formed by extending oppositely to each other from the end of the second plier arm and the first end of the second clamping arm respectively, the fourth pivot portions are connected by a fourth pivot axis.

Optionally, a line connecting the first pivot axis and the third pivot axis is defined as a symmetrical axis, with the second pivot axis and the fourth pivot axis symmetrically set; the first clamping arm and the second clamping arm are symmetrically set; the first plier arm and the second plier arm are symmetrically set.

Optionally, the arm lengths of the first clamping arm, the second clamping arm, the first plier arm, and the second plier arm are all the same.

Optionally, both the first plier arm and the second plier arm are provided with non-slip sleeves.

The capillary tube plier of the present invention includes a first clamping arm, a second clamping arm, a first pressing portion, and a second pressing portion. The first end of the first clamping arm and the first end of the second clamping arm extend oppositely to each other to form first pivot portions, connected by a first pivot axis, allowing the first and second clamping arms to rotate relative to each other. The first pressing portion is provided at the second end of the first clamping arm, protruding towards the second clamping arm, forming a first pressing surface. The second pressing portion is provided at the second end of the second clamping arm, protruding towards the first clamping arm, forming a second pressing surface, set opposite to the first pressing surface. When the first clamping arm rotates to close with the second clamping arm, the first and second pressing surfaces press tightly. The extension length of the first pivot portion of the first clamping arm is substantially equal to the protruding length of the first pressing surface from the first clamping arm; the extension length of the first pivot portion of the second clamping arm is substantially equal to the protruding length of the second pressing surface from the second clamping arm. This ensures even force distribution on the first and second pressing surfaces when pressed, avoiding uneven force on the capillary tube and preventing damage or fracture caused by the capillary tube plier to produce oblique cutting force on the capillary tube, thereby avoiding capillary tube breakage or blockage during transportation.

Additionally, in the present invention of the capillary tube plier, the configuration of the first plier arm, the second plier arm, the first clamping arm, and the second clamping arm changes the direction of the force applied to the first and second clamping arms, addressing the technical issue of ease of operation of the pliers.

Additionally, in the present invention of the capillary tube plier, the first pressing portion can be detachably assembled at the second end of the first clamping arm, and the second pressing portion can be detachably assembled at the second end of the second clamping arm, solving the technical problem of multi-use for a single pair of pliers.

The detailed description of specific embodiments of this invention in the following text, in conjunction with the drawings, will make the above-mentioned and other objectives, advantages, and features of this invention clearer to those skilled in the art.

BRIEF DESCRIPTION OF THE DRAWINGS

The following text will describe some specific embodiments of the present invention in a non-limiting, exemplary manner with reference to the drawings. The same reference numerals in the drawings indicate the same or similar parts or components. It should be understood by those skilled in the art that these drawings are not necessarily drawn to scale. In the drawings.

DETAILED DESCRIPTION

Figure 1:
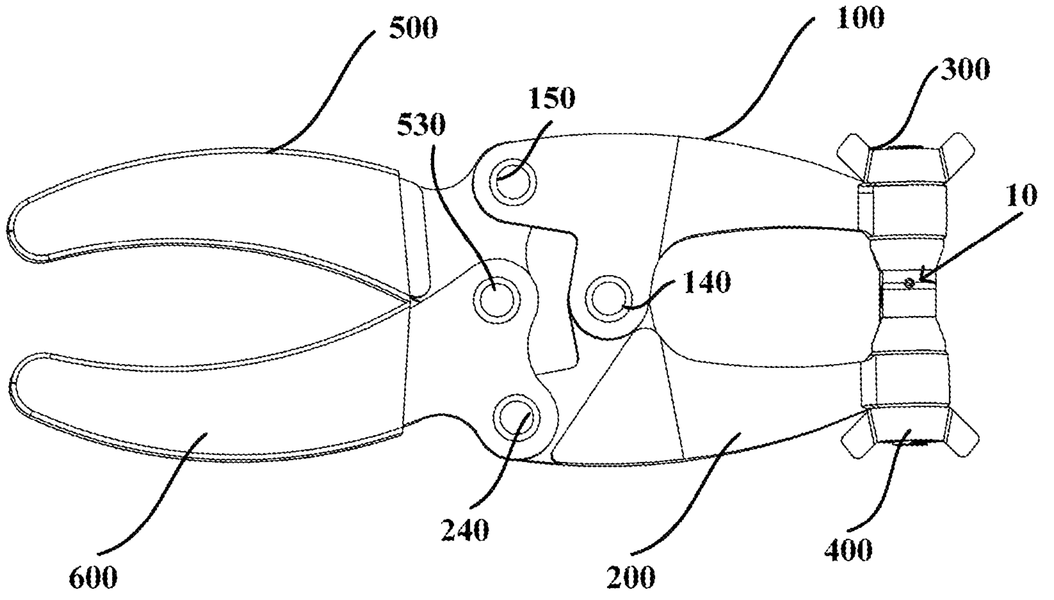
FIG. 1 is a schematic view of a capillary tube plier according to an embodiment of the present invention.
Figure 2:
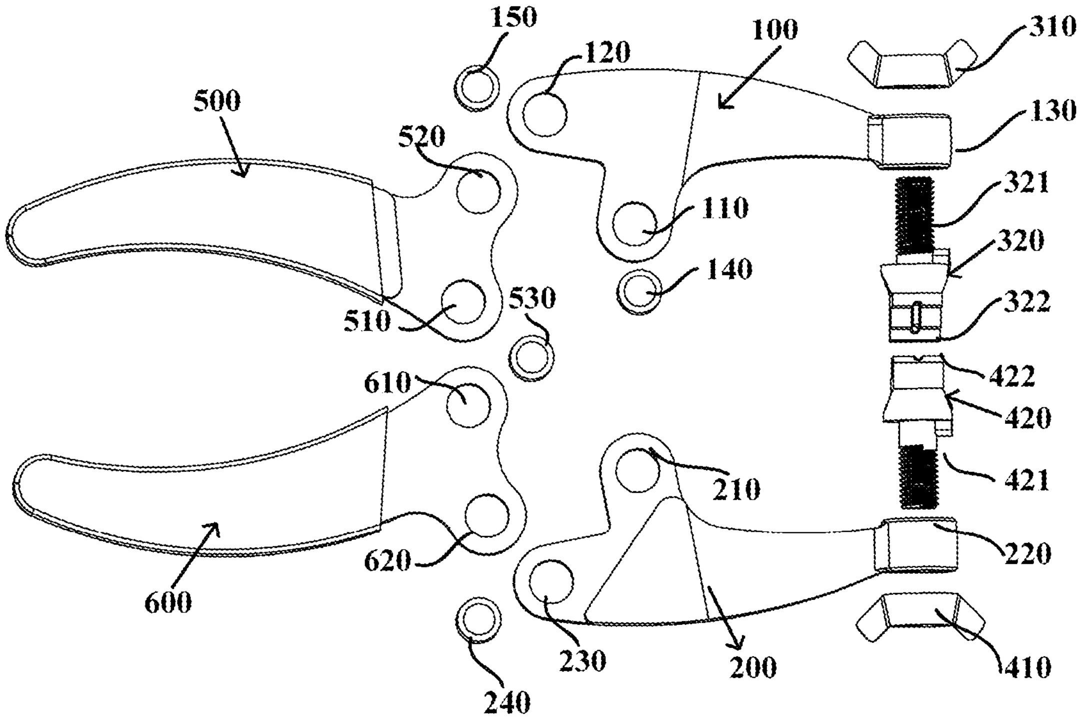
FIG. 2 is an exploded view of the capillary tube plier according to an embodiment of the present invention.

FIGS. 1 and 2 illustrate a schematic view and an exploded view of a capillary tube plier according to an embodiment of the present invention. As shown in FIGS. 1 and 2, the capillary tube plier includes a first clamping arm 100, a second clamping arm 200, a first pressing portion 300, a second pressing portion 400, a first plier arm 500, and a second plier arm 600. The first pressing portion 300 is fitted with the second pressing portion 400 to press the capillary tube into the desired shape. The first and second clamping arms 100 and 200, along with the first and second plier arms 500 and 600, apply pressure on the first pressing portion 300 and the second pressing portion 400 respectively to press the capillary tube.

The first end of the first clamping arm 100 and the first end of the second clamping arm 200 extend opposite each other to form first pivot portions 110 and 210, the first pivot portions 110 and 210 connected by a first pivot axis 140 for allowing the first and second clamping arms 100 and 200 to rotate relative to each other. As shown in FIGS. 1 and 2, the first pivot portion 110 of the first clamping arm 100 is extended to the second clamping arm 200, the second pivot portion 210 of the second clamping arm 200 is extended to the first clamping arm 100, that is first pivot portions extend along the opposite direction until overlap with each other and connect by the first pivot axis 140 at an overlapping portion.

The first pressing portion 300 is provided at the second end of the first clamping arm 100, protruding towards the second clamping arm 200 and forming a first pressing surface 322. The first pressing portion 300 and the first pivot portion 110 of the first clamping arm 100 are both protruding towards the same direction which towards the second clamping arm 200. The second pressing portion 400 is provided at the second end of the second clamping arm 200, protruding towards the first clamping arm 100 and forming a second pressing surface 422. The second pressing portion 400 and the second pivot portion 210 of the second clamping arm 200 are both protruding towards the same direction which towards the first clamping arm 100. With the second pressing surface 422 and the first pressing surface 322 set oppositely, and when the first clamping arm 100 rotates to close with the second clamping arm 200, the first pressing surface 322 and the second pressing surface 422 press tightly.

The extension length of the first pivot portion 110 of the first clamping arm 100 is substantially equal to the protruding length of the first pressing surface 322 from the first clamping arm 100; the extension length of the second pivot portion 210 of the second clamping arm 200 is substantially equal to the protruding length of the second pressing surface 422 from the second clamping arm 200. This ensures even force distribution on the first and second pressing surfaces 322 and 422 when pressed. As show in the figures, the first pressing surface 322 and the second pressing surface 422 are configured as flat surfaces or irregular surfaces. The protruding direction of the first pressing surface 322 and the protruding direction of the first pivot portion 110 of the first clamping arm 100 are same, the extension length of the first pressing surface 322 and the extension length of the first pivot portion 110 of the first clamping arm 100 are substantially equal. The protruding direction of the second pressing surface 422 and the protruding direction of the second pivot portion 210 of the second clamping arm 200 are same, the extension length of the second pressing surface 422 and the extension length of the second pivot portion 210 of the second clamping arm 200 are substantially equal. Take the embodiment of the first pressing surface 322 and the second pressing surface 422 are configured as flat surfaces, the protruding direction of the first pressing surface 322 and the protruding direction of the first pivot portion 110 of the first clamping arm 100 are same, the extension length of the first pressing surface 322 and the extension length of the first pivot portion 110 of the first clamping arm 100 are equal. Similarly, the protruding direction of the second pressing surface 422 and the protruding direction of the second pivot portion 210 of the second clamping arm 200 are same, the extension length of the second pressing surface 422 and the extension length of the second pivot portion 210 of the second clamping arm 200 are equal. Therefor even force distribution on the first and second pressing surfaces 322 and 422 when the first clamping arm 100 moves to a moment that close with the second clamping arm 200. When the capillary tube plier press the capillary tube into the desired shape, even force distribution on the first and second pressing surfaces 322 and 422. Preventing uneven force on the capillary tube to avoid damage or fracture caused by the capillary tube plier to produce oblique cutting force on the capillary tube, and further avoid the capillary tube breakage or clogging in the process of transporting the cabinet.

Figure 3:
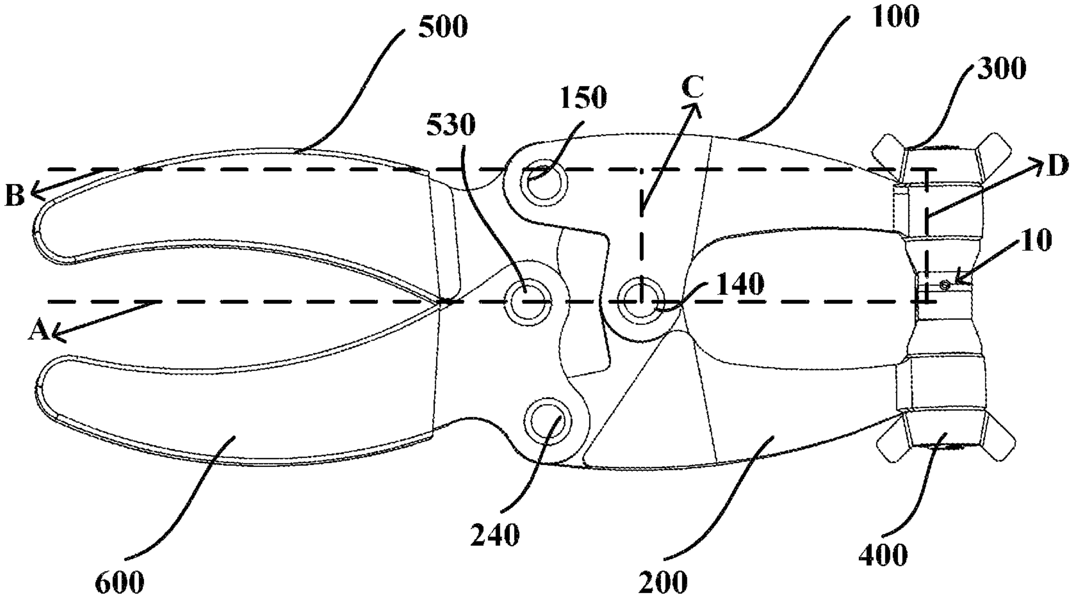
FIG. 3 is another schematic view of the capillary tube plier according to an embodiment of the present invention.

FIG. 3 shows another schematic view of the capillary tube plier according to an embodiment of the present invention. In some specific embodiments, as shown in FIG. 3, a line connecting the first pivot axis 140 and the third pivot axis 530 is defined as a symmetrical axis A, with the first and second clamping arms 100 and 200 symmetrically set; the first and second plier arms 500 and 600 are also symmetrically set. A line parallel to the symmetrical axis A and passing through part of the clamping arm forms a parallel line B. Perpendicular line segments C and D are drawn from the first pivot axis 140 and the first pressing surface 322 to the parallel line B, respectively. If the first and second pressing surfaces 322 and 422 are horizontal, then the lengths of line segments C and D are equal. If they are of irregular shape, then the lengths are substantially equal. The second pressing surface 422 and the first pivot axis are similarly arranged. Thus, this configuration ensures that the first and second pressing surfaces 322 and 422 receive uniform force at the moment of closing when the capillary tube plier press the capillary tube into the desired shape. This even force distribution prevents uneven force on the capillary tube, avoiding damage or fracture caused by the capillary tube plier to produce oblique cutting force on the capillary tube, and further avoiding the capillary tube breakage or clogging in the process of transporting the cabinet.

In some embodiments, the capillary tube plier also includes a first plier arm 500 and a second plier arm 600. An ends of the first plier arm 500 and the first end of the first clamping arm 100 extend oppositely to each other to form second pivot portions 120 and 520, connected by a second pivot axis 150. That is, the first pivot portion 110 of the first clamp arm 100 and the second pivot portion 120 of the first clamp arm 100 extend in different directions from the first end of the first clamp arm 100, wherein the second pivot portion 120 of the first clamp arm 100 is connected to the second pivot portion 520 of the first clamp arm 500 by a second pivot shaft 150. An end of the second plier arm 600 and the first plier arm 500 extend towards each other to form third pivot portions 510 and 610, connected by a third pivot axis 530. The end of the second plier arm 600 and the first end of the second clamping arm 200 also extend oppositely to form fourth pivot portions 230 and 620, connected by a fourth pivot axis 240. That is, two pivot portions extend in different directions from the first end of the first clamp arm 100, two pivot portions extend in different directions from the first end of the second clamp arm 200, two pivot portions extend in different directions from the end of the second plier arm 600, two pivot portions extend in different directions from the end of the first plier arm 500, wherein each two opposing pivot portions of the pivot portions above are rotationally connected in the manner described above to connect the first plier arm 500, the second plier arm 600, the first clamp arm 100 and the second clamp arm 200. The first and second plier arms 500 and 600 are provided with non-slip sleeves to prevent slippage during operation.

Due to the rotational connection of the end of the first plier arm 500 to the first clamping arm 100 and the end of the second plier arm 600 to the second clamping arm 200, a small force applied to the first and second plier arms 500 and 600 can exert a large force on the first and second pressing portions 300 and 400.

Without the first and second plier arms 500 and 600, opening the clamping arms would require gripping the first and second clamping arms 100 and 200 directly and applying a clamping force. Closing the clamping arms to apply force to the first clamping arm 100 and the second clamping arm 200 to press the capillary tube requires applying an opening force to both sides of the first clamping arm 100 and the second clamping arm 200, which can be inconvenient and less effective.

The arrangement of the first and second plier arms 500 and 600, along with the first and second clamping arms 100 and 200, changes the direction of the applied force, making operation easier. Specifically, when applying force to press the capillary tube, one simply needs to grip the first and second plier arms 500 and 600. To open the first and second clamping arms 100 and 200, one just releases the first and second plier arms 500 and 600, facilitating force application and operation.

In some embodiments, a line connecting the first pivot axis 140 and the third pivot axis 530 is defined as a symmetrical axis A, with the second pivot axis 150 and the fourth pivot axis 240 symmetrically arranged. The first and second clamping arms 100 and 200, as well as the first and second plier arms 500 and 600, are symmetrically arranged, with all having the same arm lengths. This symmetrical arrangement ensures even distribution of force on the first and second pressing portions 300 and 400.

Figure 4:
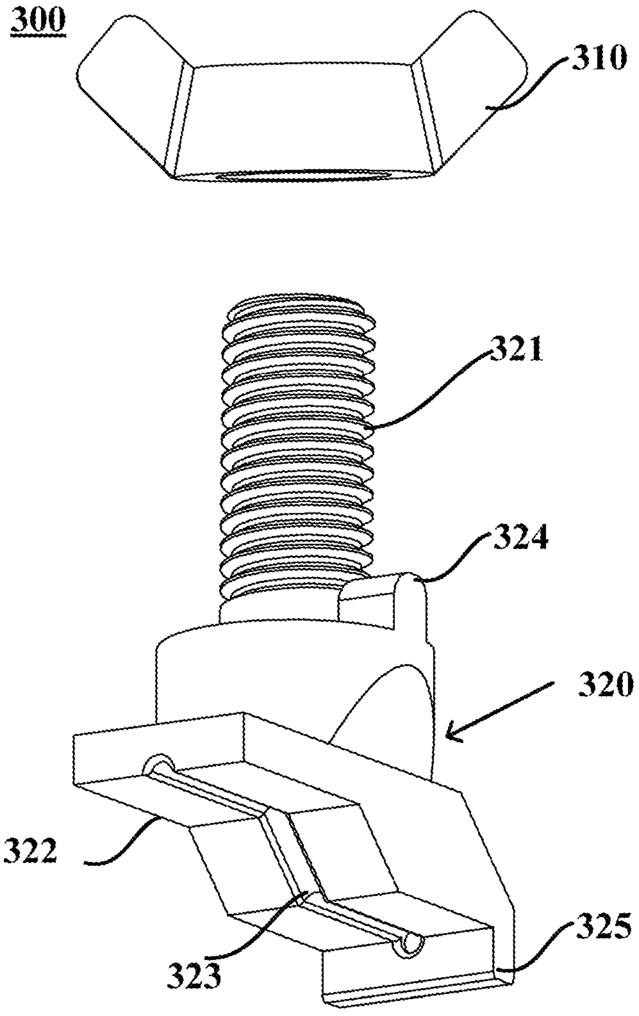
FIG. 4 is a schematic view of the first pressing portion of the capillary tube plier according to an embodiment of the present invention.
Figure 5:
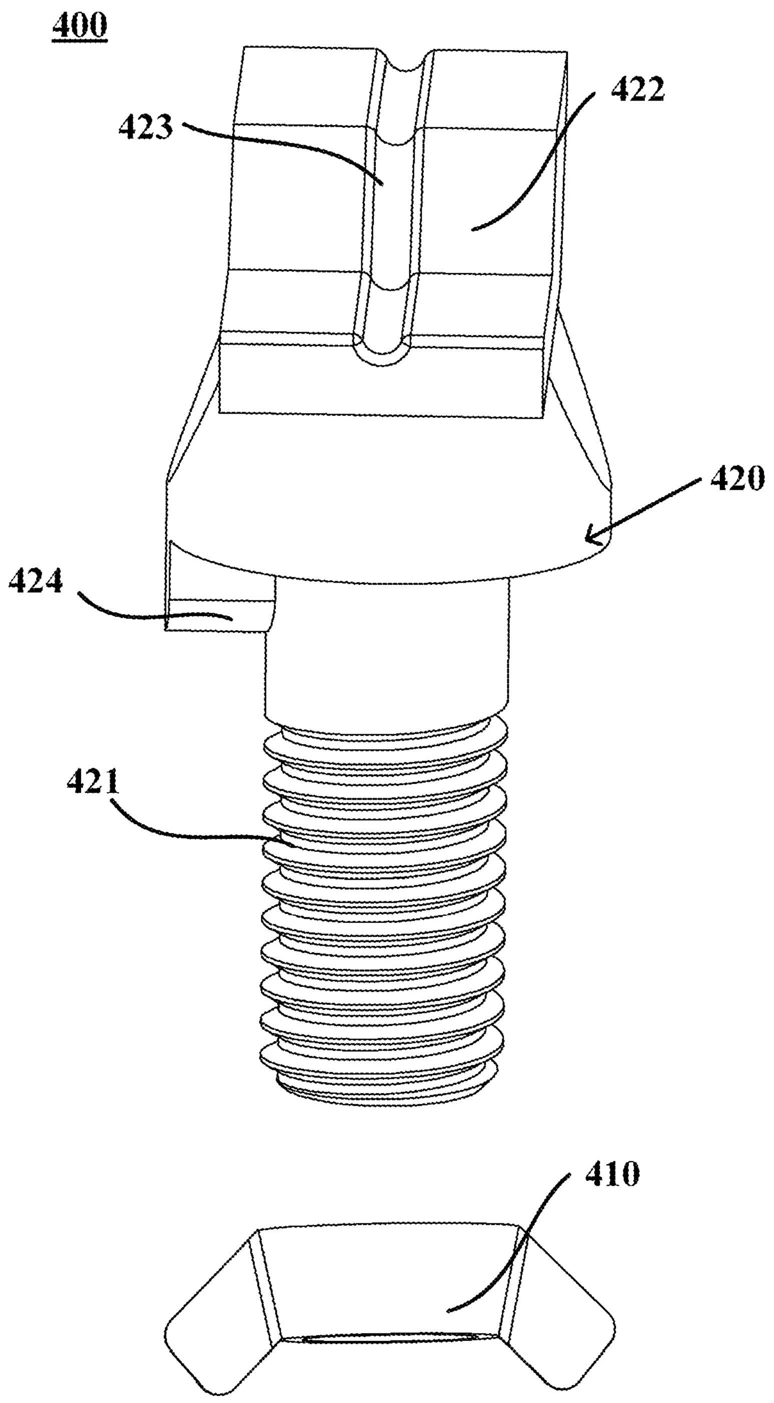
FIG. 5 is a schematic view of the second pressing portion of the capillary tube plier according to an embodiment of the present invention.

FIGS. 4 and 5 show the first and second pressing portions of the capillary tube plier in an embodiment of the present invention. As show in FIG. 1 to FIG. 5, in some embodiments, the first pressing surface 322 provides a first accommodating slot 323 passing through the first pressing surface, and the second pressing surface 422 provides a second accommodating slot 423 passing through the second pressing surface. When the first and second pressing surfaces 322 and 422 are pressed, the first and second accommodating slots 323 and 423 align oppositely to form a clamping cavity 10. The first pressing surface 322 is configured according to the required shape of the capillary tube, and the second pressing surface 422 is adapted to the shape of the first pressing surface 322 to press the capillary tube into the desired shape.

The specific shapes of the first and second pressing surfaces 322 and 422, the first and second accommodating slots 323 and 423, and the clamping cavity 10 are not limited and can vary according to the shape required for pressing the capillary tube. For example, the central portions of the first and second pressing surfaces 322 and 422 can be inclined to form an inclined clamping cavity 10, thus pressing the capillary tube into a Z-like shape, which can solve the issue of fitting the capillary tube into parts of the refrigeration device, avoiding issues of the capillary tube being too long or too short. Clearly, this method of solving the fitting issue is exemplary and not the only possible solution.

In this embodiment, an end of the first pressing portion body 320 extends towards the second pressing portion body 420 with a limiting plate 325 located at the end of the first accommodating slot 323. The limiting plate 325 is used to position the installation location of the second pressing portion 400. Further, the limiting plate 325 determines the length of the capillary tube entering the clamping cavity 10, ensuring the correct length of the capillary tube when assembled into parts of the refrigeration device, thus achieving precise positioning of the capillary tube, which can solve the issue of fitting the capillary tube into parts of the refrigeration device, avoiding issues of the capillary tube being too long or too short.

Figure 6:
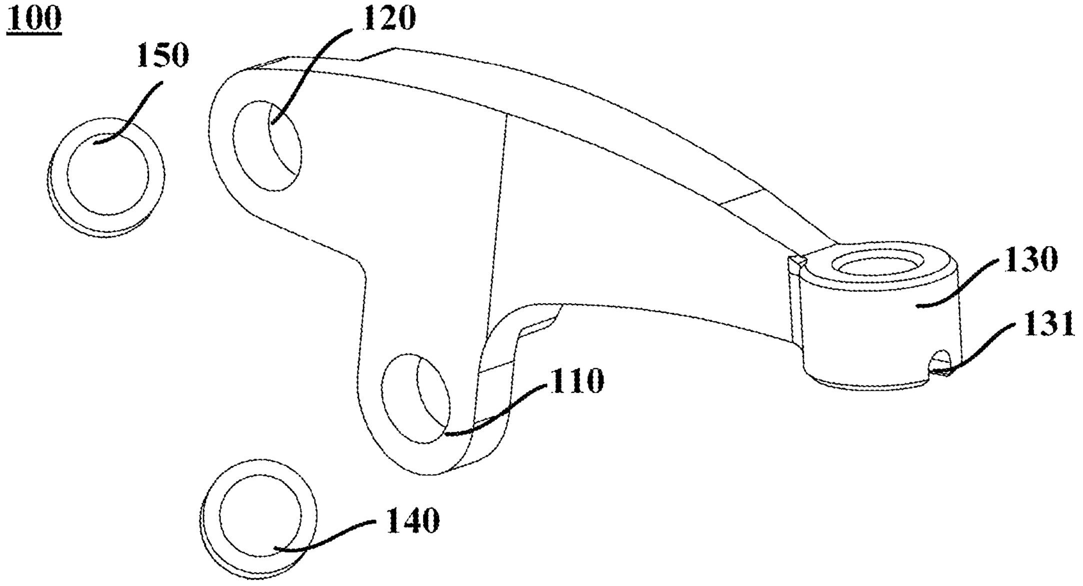
FIG. 6 is a schematic view of the first clamping arm of the capillary tube plier according to an embodiment of the present invention.
Figure 7:
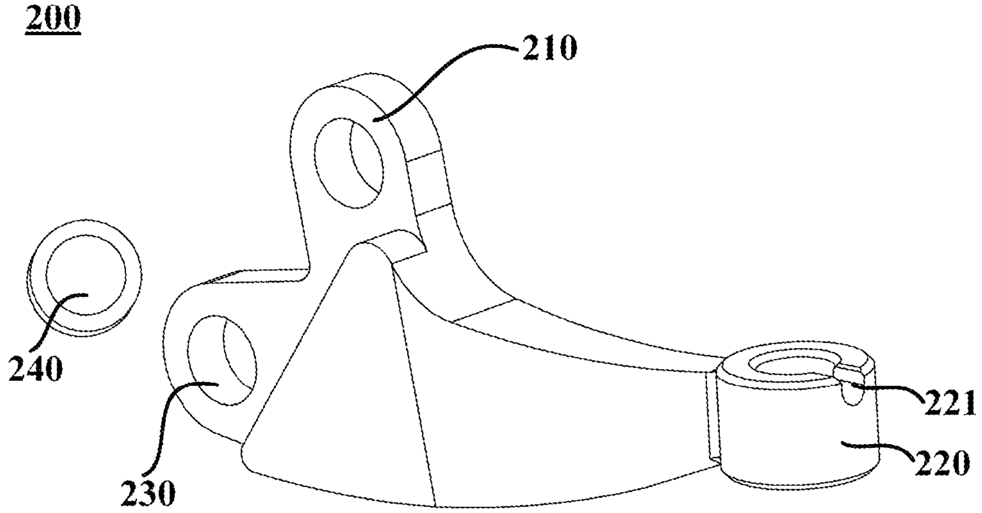
FIG. 7 is a schematic view of the second clamping arm of the capillary tube plier according to an embodiment of the present invention.

FIGS. 6 and 7 illustrate the first clamping arm and the second clamping arm of the capillary tube plier according to an embodiment of the present invention. In some embodiments, the first pressing portion 300 is detachably assembled at the second end of the first clamping arm 100, and the second pressing portion 400 is detachably assembled at the second end of the second clamping arm 200. This detachable assembly allows for the replacement of the first and second pressing portions 300 and 400, enabling multi-use of a single pair of pliers and allowing for the pressing of different models and shapes of capillary tubes, as well as facilitating the portability of the pliers.

Specifically, as shown in FIGS. 6 and 7, the second end of the first clamping arm 100 provides a first cylinder 130 protrude from the second end of the first clamping arm 100; the first pressing portion 300 includes a first locking nut 310 and a first pressing portion body 320, with the end of the first pressing portion body 320 opposite the first pressing surface 322 protruding a first bolt 321. The first bolt is configured to opposite to the first pressing surface. The first bolt 321 passes through and protrudes from the first cylinder 130, and the portion of the first bolt 321 protruding from the first cylinder 130 is fitted with the first locking nut 310 to fix the first pressing portion body 320 at the second end of the first clamping arm 100. The second end of the second clamping arm 200 provides a second cylinder 220; the second pressing portion 400 includes a second locking nut 410 and a second pressing portion body 420, with the end of the second pressing portion body 420 opposite the second pressing surface 422 protruding a second bolt 421. The second bolt is configured to opposite to the second pressing surface. The second bolt 421 passes through and protrudes from the second cylinder 220, and the portion of the second bolt 421 protruding from the second cylinder 220 is fitted with the second locking nut 410 to fix the second pressing portion body 420 at the second end of the second clamping arm 200. This assembly method is simple and easy to disassemble.

In some embodiments, the first cylinder 130 provides a first notch 131, and the first pressing portion body 320 provides a first protrusion 324, which is accommodated in the first notch 131 to position the first pressing portion body 320 relative to the first cylinder 130. Similarly, the second cylinder 220 provides a second notch 221, and the second pressing portion body 420 provides a second protrusion 424, which is accommodated in the second notch 221 to position the second pressing portion body 420 relative to the second cylinder 220. This positioning facilitates precise alignment of the first and second accommodating slots 323 and 423, avoiding damage to the capillary tube. It is evident that this positioning method is exemplary and not the only possible way to achieve this.

In conclusion, those skilled in the art should recognize that while several exemplary embodiments of this invention have been thoroughly demonstrated and described, numerous other variants or modifications that conform to the principles of this invention can be directly determined or derived from the content disclosed by this invention without departing from its spirit and scope. Therefore, the scope of this invention should be understood and recognized as covering all these other variants or modifications.

What is claimed is:

1. A capillary tube plier, comprising:

a first clamping arm;

a second clamping arm, wherein first pivot portions are formed by extending oppositely to each other from a first end of the first clamping arm and a first end of the second clamping arm respectively, and the first pivot portions are connected by a first pivot axis for allowing the first and second clamping arms to rotate relative to each other;

a first pressing portion, provided at a second end of the first clamping arm, protruding towards the second clamping arm and forming a first pressing surface; and a second pressing portion, provided at a second end of the second clamping arm, protruding towards the first clamping arm and forming a second pressing surface, with the second pressing surface and the first pressing surface set oppositely, and when the first clamping arm rotates to close with the second clamping arm, the first pressing surface and the second pressing surface press tightly;

wherein the extension length of the first pivot portion of the first clamping arm is substantially equal to the protruding length of the first pressing surface from the first clamping arm; the extension length of the first pivot portion of the second clamping arm is substantially equal to the protruding length of the second pressing surface from the second clamping arm; to make the first pressing surface and second pressing surface receive even force when pressed;

wherein a first cylinder protruding from the second end of the first clamping arm;

the first pressing portion comprises a first locking nut and a first pressing portion body, a first bolt protruding from the end of the first pressing portion body opposite to the first pressing surface, the first bolt passes through and protrudes from the first cylinder, and the portion of the first bolt protruding from the first cylinder is fitted with the first locking nut to fix the first pressing portion body at the second end of the first clamping arm;

a second cylinder protruding from the second end of the second clamping arm;

the second pressing portion comprises a second locking nut and a second pressing portion body, a second bolt protruding from the end of the second pressing portion body opposite to the second pressing surface, the second bolt passes through and protrudes from the second cylinder, and the portion of the second bolt that protrudes from the second cylinder is fitted with the second locking nut to fix the second pressing portion body at the second end of the second clamping arm;

wherein the first cylinder provides a first notch, and the first pressing portion body provides a first protrusion, the first protrusion is accommodated in the first notch to position the first pressing portion body relative to the first cylinder;

the second cylinder provides a second notch, and the second pressing portion body provides a second protrusion, the second protrusion is accommodated in the second notch to position the second pressing portion body relative to the second cylinder.

2. The capillary tube plier according to claim 1, wherein the first pressing surface provides a first accommodating slot passing through the first pressing surface; the second pressing surface provides a second accommodating slot passing through the second pressing surface;

when the first pressing surface and the second pressing surface are pressed, the first accommodating slot and the second accommodating slot align oppositely to form a clamping cavity.

3. The capillary tube plier according to claim 1, wherein the first pressing surface is configured according to a required shape of a capillary tube, and the second pressing surface is adapted to the shape of the first pressing surface to press the capillary tube into the desired shape.

4. The capillary tube plier according to claim 1, wherein the first pressing portion is detachably assembled at the second end of the first clamping arm;

the second pressing portion is detachably assembled at the second end of the second clamping arm.

5. The capillary tube plier according to claim 1, further comprising:

a first plier arm, wherein second pivot portions are formed by extending oppositely to each other from an end of the first plier arm and the first end of the first clamping arm respectively, the second pivot portions are connected by a second pivot axis; and a second plier arm, wherein third pivot portions are formed by extending oppositely to each other from an end of the second plier arm and the end of the first plier arm respectively, the third pivot portions are connected by a third pivot axis;

wherein fourth pivot portions are formed by extending oppositely to each other from the end of the second plier arm and the first end of the second clamping arm respectively, the fourth pivot portions are connected by a fourth pivot axis.

6. The capillary tube plier according to claim 5, wherein a line connecting the first pivot axis and the third pivot axis is defined as a symmetrical axis, with the second pivot axis and the fourth pivot axis symmetrically set; the first clamping arm and the second clamping arm are symmetrically set; the first plier arm and the second plier arm are symmetrically set.

7. The capillary tube plier according to claim 6, wherein the arm lengths of the first clamping arm, the second clamping arm, the first plier arm, and the second plier arm are all the same.

8. The capillary tube plier according to claim 5, wherein both the first plier arm and the second plier arm are provided with non-slip sleeves.

* * * * *